United States Patent [19]
Kowachek et al.

[11] 3,902,767
[45] Sept. 2, 1975

[54] ANTI-PITCHING AND ANTI-HEAVING SUSPENSION FOR WHEELED VEHICLES

[75] Inventors: Victor J. Kowachek, Mt. Clemens, Mich.; James P. Carr, Silver Spring, Md.; Harold G. Kirchner, Issaquah, Wash.

[73] Assignee: The United States of America as represented by the Secreaty of the Army, Washington, D.C.

[22] Filed: July 26, 1974

[21] Appl. No.: 492,114

[52] U.S. Cl. .................................. 305/34; 115/1 R
[51] Int. Cl.² ......................................... B62D 55/00
[58] Field of Search .............. 305/8, 10, 16, 17, 18, 305/34; 115/1 R

[56] References Cited
UNITED STATES PATENTS 3,020,059   2/1962   Allen ..................................... 305/34
3,539,229   11/1970   Scully ................................... 305/10

*Primary Examiner*—Philip Goodman
*Assistant Examiner*—John A. Carroll
*Attorney, Agent, or Firm*—Peter A. Taucher; John E. McRae

[57] ABSTRACT

A multi-terrain vehicle having ground-engaging tires arranged for orbital movement along upper and lower surfaces of sponsons located outboard of the hull. The tires are interconnected by means of chains, cables or similar flexible elements so that the tires move along the ground surface in one direction to develop vehicle propulsion thrust in the opposite direction. The tires are arranged to be gradually loaded and unloaded during their periods of engagement with the sponson lower surface to minimize pitching and heaving of the vehicle.

1 Claim, 6 Drawing Figures

ANTI-PITCHING AND ANTI-HEAVING SUSPENSION FOR WHEELED VEHICLES

The invention described herein may be manufactured, used, and licensed by or for the Government for governmental purposes without payment to us of any royalty thereon.

BACKGROUND OF THE INVENTION

Vehicles of the present type have been previously suggested; see for example U.S. Pat. No. 3,154,045 issued to A. G. Fisher and U.S. Pat. No. 2,916,006 issued to L. Crandall. The present invention proposes a tire and arrangement intended to minimize the tendency of such vehicles to heave or pitch up and down during vehicle movement.

SUMMARY OF THE INVENTION

The present invention proposes an arrangement wherein essentially flat lower surfaces of the sponsons extend as nearly as practicable an even number of tire pitches, and wherein such flat lower surfaces are centered on a transverse plane passing through the vehicle center of gravity. The essentially flat lower surfaces of the sponsons are preferably slightly sloped to provide trapezoidal tire loading distribution and balanced tire load moments about the vehicle center of gravity. The aim is to minimize vehicle pitching and heaving during steady state ride and rapid speed changes. An additional aim is to achieve the anti-pitching action without materially sacrificing the turning capabilities of the vehicle.

THE DRAWINGS

THE DRAWINGS IN DETAIL

Figure 1:
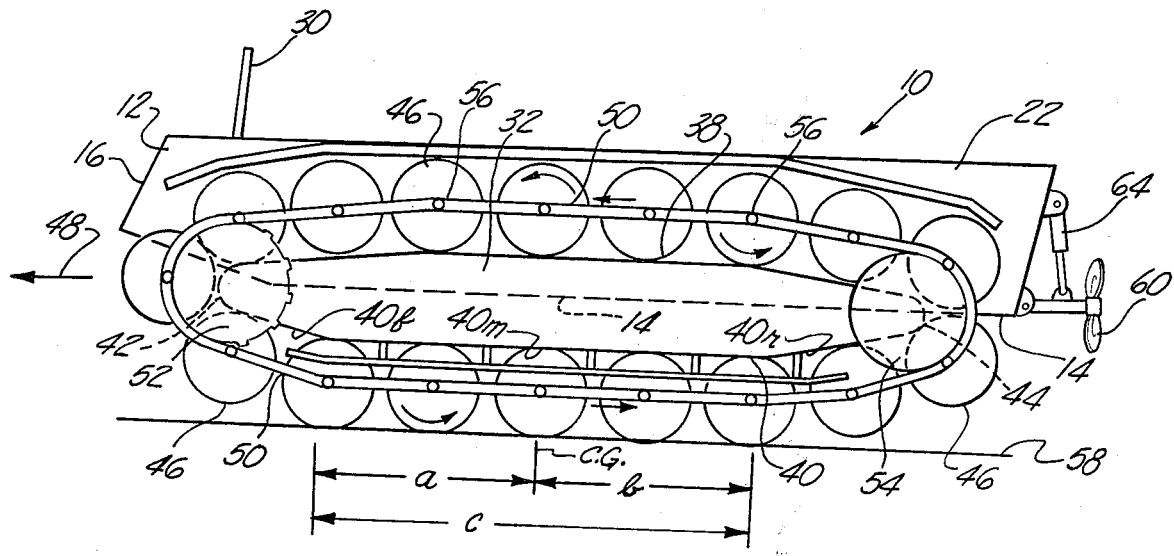
FIG. 1 is a side elevational view of a vehicle incorporating the present invention.
Figure 2:
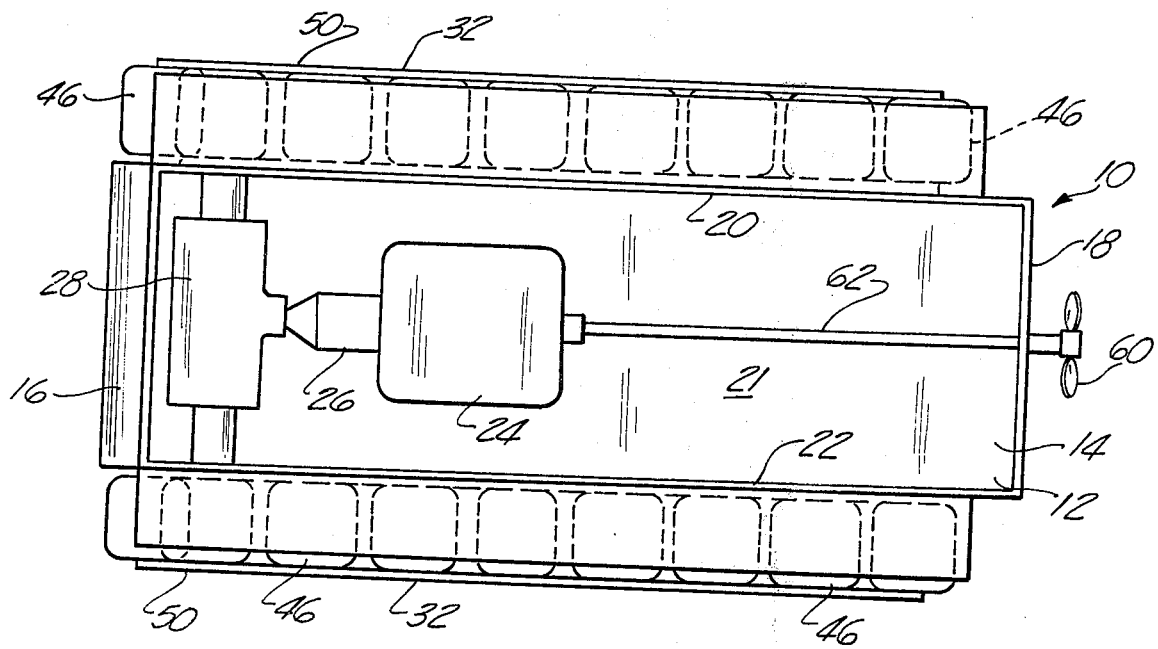
FIG. 2 is a top plan view of the FIG. 1 vehicle.

FIGS. 1 and 2 illustrate a multi-terrain vehicle 10 comprising an open-topped hull 12 having a bottom wall 14, front wall 16, rear wall 18 and side walls 20 and 22. Disposed within the hull is a propulsion engine 24 equipped with a transmission 26 and steering unit 28 having laterally extending output shafts extending through openings in the hull side walls 20 and 22. The steering unit is employed to selectively operate the output shafts at variable speeds in the forward or rearward directions in accordance with the desired vehicle speed and direction of vehicle movement. The driver's seat, not shown, is located above and to one side of transmission 26, a short distance behind windshield 30. passengers and/or cargo can be accommodated in the space 21 behind engine 24.

Figures 3, 4:
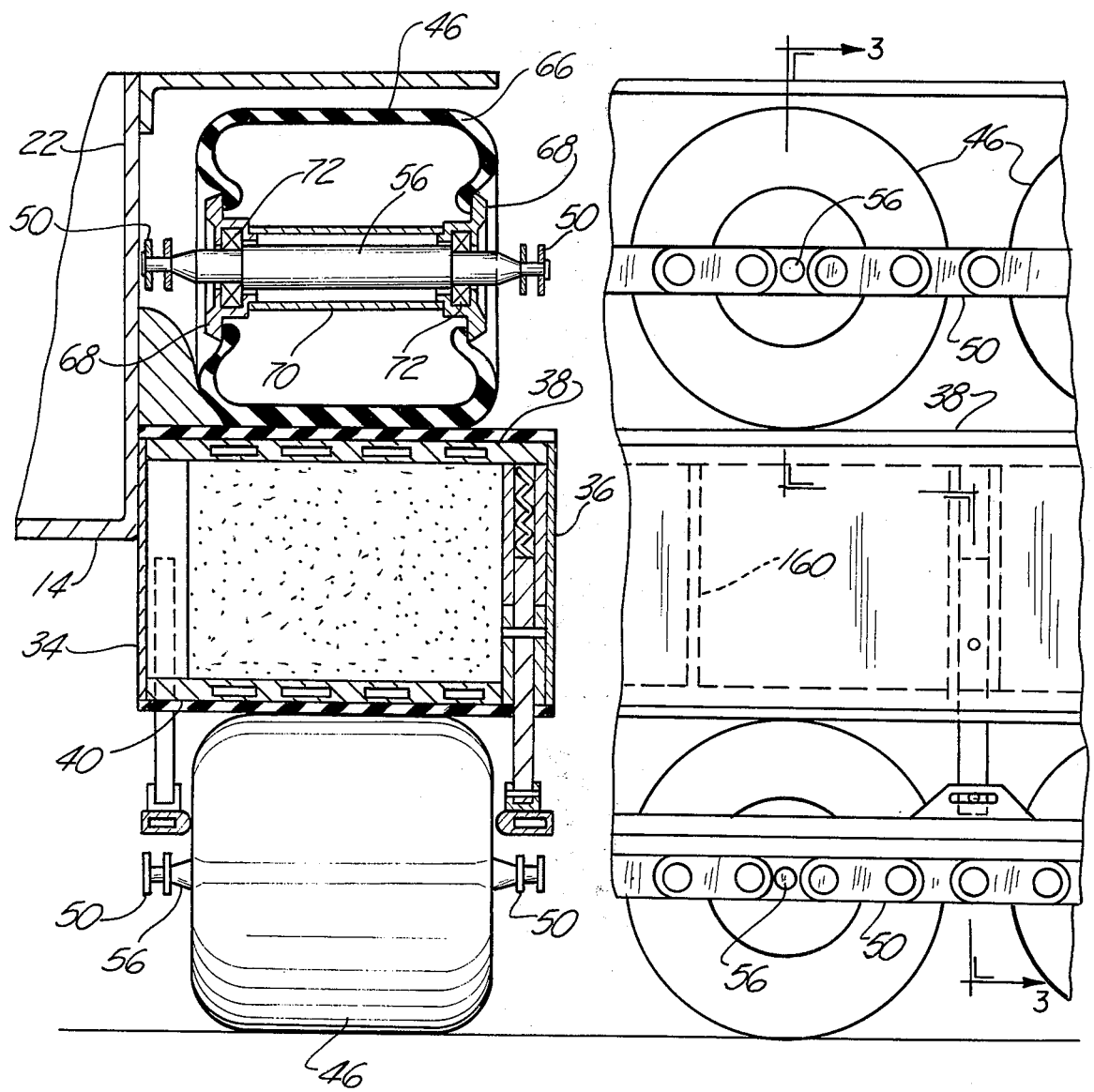
FIG. 3 is a sectional view taken on line 3—3 in FIG. 4.
FIG. 4 is an enlarged fragmentary view taken in the same direction as FIG. 1 at a point midway between the front and rear ends of the vehicle.

Located outboard of hull 12 are two longitudinally extending sponsons 32, each a mirror-image of the other. As seen in FIG. 3 the rightmost sponson comprises an inner side wall 34 secured to hull side wall 22, an outer side wall 36, an upper wall 38, and a lower wall 40. As seen in FIG. 1 the sponson upper and lower walls are joined together by a generally elliptical front nose structure 42 and a generally elliptical rear nose structure 44.

Each of the sponson walls 38 and 40 include a rigid metal underwall and a resilient elastomeric outer wall or skin; the underwall provides sponson rigidity, and the skin provides a tread surface for tractive engagment with the ground-engaging tires 46.

Arranged for orbital movement about each sponson 32 are 17 ground-engaging tires or wheels 46. Each tire traverses an endless orbit defined by upper sponson wall 38, frontal nose structure 42, lower sponson wall 40, and rear nose structure 44. When the vehicle is travelling in the forward direction, as denoted by numeral 48 in FIG. 1, the lower ones of tires 46 will be travelling rearwardly along sponson surface 40, and the upper ones of tires 46 will be travelling forwardly along sponson surface 38. Tire movement is accomplished through a power means which includes endless chains 50, sprocket-type drive wheels 52 at the sponson frontal nose, and idler wheels 54 at the sponson rear nose. Chains 50 could be replaced by cables if desired or necessary; cables are advantageous in that they are less susceptible to malfunction due to twisting, bending, clogging, etc.

As shown in FIG. 1, each set of chains 50 is trained around drive sprocket 52 and idler wheel 54; additionally each set of chains is connected to the various tire axles 56. Accordingly, powered movement of the sprocket wheels (by the aforementioned engine 24) produces an orbital movement of the chains 50 and the connected tires 46. The vehicle weight is borne by the tires while engaged with firm ground surface 58. Assuming the vehicle is travelling in the forward direction over firm terrain, the ground-engaged tires will be compressed between ground surface 58 and sponson lower wall 40. Tire compression will produce frictional tractive forces between the tire lower surface and the ground, and between the tire upper surface and the sponson. Such tractive forces combine with chain translational movements to propel the vehicle over firm terrain.

In very loose terrain, such as deep snow or swamps or loose sand, the vehicle weight can cause the vehicle to sink into the terrain so that the vehicle weight is borne directly by the sponsons rather than by the tires. Under such conditions the tires are subjected to reduced weight loads, and hence reduced tractive engagement with the terrain; the tires may then tend to skid on the sponson lower wall. Translational movement of the lower run of each chain will then translate each tire in piston-like fashion through the terrain, thereby bodily displacing the terrain and reacting the vehicle in the arrow 48 direction (assuming the chains are moving in the FIG. 1 directions). In deep water operations the vehicle control may be enhanced by means of a propeller 60 located at the stern of the hull and suitably connected to engine 24, as by means of a drive shaft 62 and flexible coupling (not shown). For overland operations the propeller may be retracted upwardly from its FIG. 1 position by a suitable fluid cylinder 64.

TIRE-CHAIN RELATION

FIG. 3 illustrates the general constructional features of a representative tire and its connection to the propelling chains. As there shown, the tire comprises a tire carcass 66 mounted on metal rims 68 carried by a tubular connector 70. Suitable sealed bearings 72 are provided between tube 70 and the supporting axle 56. The outer ends of the axle are affixed to the chains in any suitable fashion, as for example by welding. The axle thus travels with the chains, and the tire is free to rotate around the axle on the bearings 72. The annular space defined between tube 70 and tire carcass 66 is inflated to a suitable pressure such as 15 p.s.i.; the space may be foam-filled for bullet-proofing purposes if found necessary or desirable.

VEHICLE PITCHING AND HEAVING

The vehicle should if possible be designed to avoid up and down heaving and fore and aft pitching; i.e., a tendency of the vehicle to dip down at the front and to raise up at the rear, and vice versa.

To prevent pitching and heaving during travel on flat smooth surfaces the net moments around the vehicle's center of gravity resulting from the tire loads must be zero as the tires move through one tire pitch distance; a tire pitch distance is here considered to be the space between two adjacent axles 56, i.e., the distance each tire must travel before it assumes the position initially occupied by the preceding tire.

The desired zero moment condition is theoretically accomplished by constructing the sponson so that the moments from the tires becoming loaded and unloaded (near the front and rear areas of the sponson, respectively) are exactly equal and 180° out of phase as the tires travel through one tire pitch distance. This requires that the sponson be essentially flat for an integral number of tire pitches, and that the essentially flat zone be centered on the vehicle center of gravity; the essentially flat zone is slightly sloped to gradually increase and later decrease the loading on each tire as it moves through the essentially flat zone.

Figure 5:
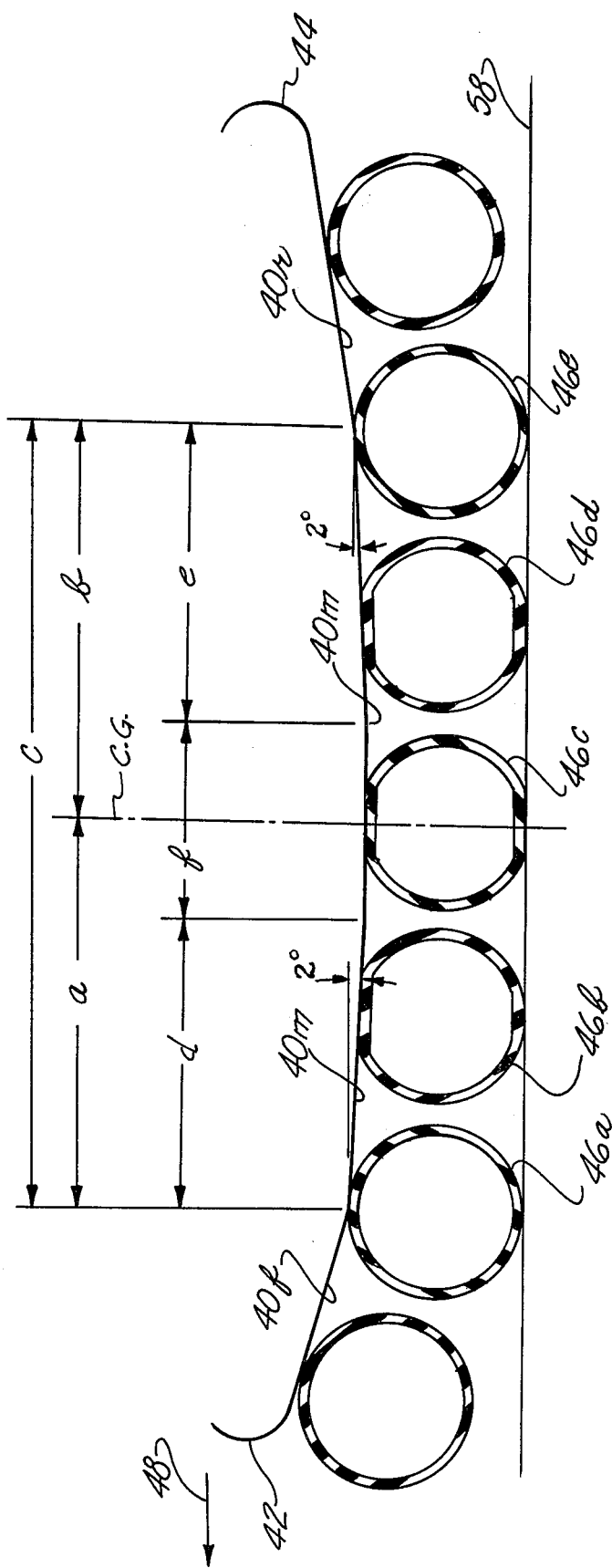
FIG. 5 is an enlarged view of a sponson-tire structure used in the FIG. 1 vehicle.

As seen in FIG. 5, the sponson lower surface is provided with an essentially flat horizontal zone 40m defined by the fore-aft dimension "C." This essentially flat zone is centered on the unloaded vehicle center of gravity plane C.G.; i.e., dimension a measured forwardly from the transverse plane C.G. equals dimension b measured rearwardly from plane C.G. Additionally the essentially flat zone 40m has a length C that is substantially an integral number of tire pitches; in the FIG. 5 illustration zone 40m has a length approximating four tire pitches.

The flat zone 40m is preceded by a downwardly sloping lead-in surface 40f. At its rear limit zone 40m merges into an upwardly sloping lead-out surface 40r. The various surfaces 40m, 40f and 40r are illustratively shown as individual flat surfaces angled to one another in acute angular relationship. In practice these surfaces may be segmental portions of a single curved surface extending the full sponson length. A practical consideration is the manufacturing capability for closely holding curvatures on an elongated sponson surface, which in a representative construction might measure fifteen feet or more between the two tip areas 42 and 44. In a practical senses the various zone surfaces 40m, 40f and 40r would each be essentially flat.

Zone 40m may be considered the tire loading zone during the so-called normal operating modes. Thus, each tire does not begin to support any part of the vehicle weight until it has passed from zone 40f onto zone 40m. After the tire leaves zone 40m and passes onto zone 40r it no longer supports any part of the vehicle weight.

Zone 40m, while being essentially flat and horizontal, is nevertheless slightly sloped in selected areas to achieve a graduated or progressive change in tire loading as each tire travels through zone 40m. In general, the sponson surface area designated by letter d slopes downwardly from front to rear, whereas the sponson surface area designated by letter e slopes upwardly from front to rear; the intermediate surface area designated by letter f is horizontal, i.e., not sloped.

Figure 6:
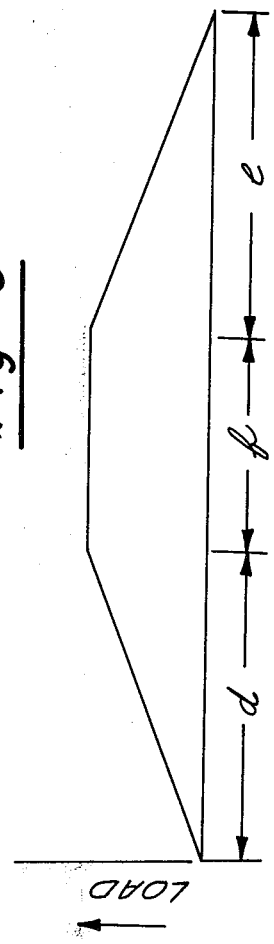
FIG. 6 is a chart depicting a trapezoidal tire loading provided by the FIG. 5 structure.

Sloped surface d produces a gradual increase in tire loading as the tire moves rearwardly relative to the sponson surface. Sloped surface e produces a gradual decrease in tire loading as the tire moves rearwardly therealong. If we assume the vehicle is moving forwardly, the tire occupying position 46a is just starting to be loaded, whereas the tire in position 46c has its maximum full loading, and the tire occupying position 46e is substantially unloaded. The FIG. 6 graph shows generally the graduated changes in tire loading produced by sponson surfaces d, e, and f. The graph has a trapezoidal shape; hence it is considered to represent a trapezoidal tire load distribution.

The slope angle of surfaces d and e is preferably quite small, on the order of 2°. Assuming a given air inflation tire pressure, the weight supported by each tire is at least partly a function of the tire surface area in contact with the sponson. Therefore the tire dimensions and inflation air pressure should be such as to permit the sponson slope surfaces to effect gradual changes in tire-sponson contact surface area as the tire moves along the sponson surface. The slopes of surfaces d and e may be selected in accordance with different affecting conditions, such as tire size, vehicle weight, and vehicle length. Whatever their slope, surfaces d and e should be substantially the same length. Additionally such surfaces should be the same distance from plane C.G., and such surfaces should have the same slope. Finally, each of surfaces d, e and f should be an integral number of tire pitches in length. These relationships permit the tires to be gradually loaded and unloaded at the same rate, thereby balancing the moments around the vehicle's center of gravity during the time taken by each tire to move one tire pitch distance.

It will be realized that when the vehicle is loaded with cargo and/or personnel in space 21 the vehicle's center of gravity shifts slightly to the rear. In a typical vehicle the shift in C.G. might be on the order of 2 inches. With the above-described sponson contour such a shift in the C.G. has a relatively slight effect on vehicle stability.

During rapid accelerations and decelerations the vehicle will tend to dip or heave; the sponson contour tends to resist such tendencies. The sponson lead-in surface 40f and lead-out surface 40r may on occasion come into play as tire-loading surfaces. These surfaces have slope angles on the order of 10°, which is small enough to permit the tires to approach and leave the ground surface at a relatively slight angle. During the approach phase the tires gradually come into contact with the ground instead of abruptly striking the ground to impart an upward jarring force on the hull. During the leaving phase the tires gradually release from the ground. During panic starts and stops the lead-in surface 40f and lead out surface 40r act as extensions of the load surface 40m to minimize dipping and heaving tendencies. Each of surfaces 40f and 40r are of appreciable length, i.e., at least one tire pitch.

TURNING CAPABILITY

This type vehicle is turned by operating the steering unit 28 to produce differential motion of the sprocket wheels 42 on opposite sides of the vehicle. All tires on a given side of the vehicle move translationally at the speed dictated by the associated sprocket wheel. The approximately four tires engaged with the terrain at each side of the vehicle tend to direct the vehicle in the defined path or track. The tires thus resist vehicle turning forces generated by steering unit 28. The vehicle is forced to turn by tire skid action.

The sponson lower surface contour shown in FIG. 5 tends to facilitate skid steer action, due to the fact that tire ground traction is localized in a comparatively few tires. As seen in FIG. 5, tire 46c exerts the greatest tractive effect. Tires 46b and 46d exert lesser tractive effects. The comparatively short tractive length defined by tires 46b, 46c and 46d is centered on the center of gravity plane C.G. Tire 46c is required to undergo little or no skidding to negotiate a turn; the traction produced by this tire initiates and locates the turning point. Tires 46b and 46d are required to skid to a certain extent, but these tires have lesser tractive presure than tire 46c; hence the skidding force requirements are held at reasonably low values.

We wish it to be understood that we do not desire to be limited to the exact details of construction shown and described, for obvious modifications will occur to a person skilled in the art.

We claim:

1. A multi-terrain vehicle of the skid-steer type comprising a hull, longitudinally extending sponsons carried outboard of the hull; rotary terrain-engaging tires powered for orbital movement along the upper and lower surfaces of each sponson to propel the vehicle; each sponson including an essentially flat lower load surface extending substantially equal distances fore and aft from a transverse vertical plane passing through the center of gravity of the vehicle, and front and rear nose surfaces merging gradually into the sponson flat lower surface so that the tires approach and leave the terrain at relatively low attack angles; each essentially flat lower load surface including a forward surface area sloping downwardly from front to rear at an angle of approximately 2° for gradually increasing the tire loading, a rearward surface area sloping upwardly from front to rear at an angle of approximately 2° for gradually reducing the tire loading, and a nonsloped surface area intermediate the two sloped surface areas; each non-sloped surface area being centered on the aforementioned transverse vertical plane; the forwardly slope surface area and rearwardly sloped surface area having substantially the same length, thereby permitting the tires to be gradually loaded and unloaded at substantially the same rate and to the same extent as they move along the load surface; each load surface having a fore-aft length substantially equal to an integral number of tire pitches to maintain a movement balance around the aforementioned center of gravity during the time interval required for each tire to move one tire pitch distance.

* * * * *